(12) United States Patent
DelMaestro

(10) Patent No.: US 10,941,759 B2
(45) Date of Patent: Mar. 9, 2021

(54) CART WITH CAPACITY TO INTERNALLY STORE COMPRESSED AIR

(71) Applicant: Joseph J. DelMaestro, Southampton, NY (US)

(72) Inventor: Joseph J. DelMaestro, Southampton, NY (US)

(*) Notice: Subject to any disclaimer, the term of this patent is extended or adjusted under 35 U.S.C. 154(b) by 0 days.

(21) Appl. No.: 16/737,692

(22) Filed: Jan. 8, 2020

(65) Prior Publication Data

US 2020/0240404 A1    Jul. 30, 2020

Related U.S. Application Data

(60) Provisional application No. 62/798,086, filed on Jan. 29, 2019.

(51) Int. Cl.
  *F04B 35/06*    (2006.01)
  *B62B 1/10*     (2006.01)
  (Continued)

(52) U.S. Cl.
  CPC ............ *F04B 41/02* (2013.01); *B62B 1/10* (2013.01); *B62B 5/06* (2013.01); *F04B 35/06* (2013.01)

(58) Field of Classification Search
  CPC . B62B 1/10; B60K 13/06; F04B 41/02; F04B 35/06
  See application file for complete search history.

(56) References Cited

U.S. PATENT DOCUMENTS

| 2,384,174 | A | * | 9/1945 | Jones ..................... B60S 5/04 |
| | | | | 222/3 |
| 2,434,675 | A | * | 1/1948 | Simpson ................ F04B 49/00 |
| | | | | 417/28 |

(Continued)

FOREIGN PATENT DOCUMENTS

| DE | 3925875 A1 * | 2/1991 | .............. F04B 41/02 |
| GB | 837209 A  * | 6/1960 | .............. F04B 41/02 |

OTHER PUBLICATIONS

P. Aston, An Air-Pressurized Frame for Adventure Bikes?—Eurobike 2018, Pinkbike, Jul. 8, 2018, pp. 1-6, https://ww.pinkbike.com/news/eurobike-2018-an-air-pressurized-frame-for-an-adventure-bike.html.

(Continued)

*Primary Examiner* — Steve Clemmons
(74) *Attorney, Agent, or Firm* — Law Offices of Michael L. Wise, LLC

(57) ABSTRACT

Aspects of the invention are directed to a cart that includes a structural element, a compressor assembly, and a pressure regulator. The structural element may be a tubular frame member, a handle, or a deck. The structural element defines an internal storage volume within it. The compressor assembly is able to deliver compressed air to the internal storage volume. The pressure regulator assembly is able to deliver compressed air from the internal storage volume at a regulated pressure. Advantageously, embodiments in accordance with aspects of the invention provide cart designs that are capable of both transporting heavy loads and serving as sources of compressed air. A user utilizing one of these carts therefore does not need to bother with transporting a separate air compressor to a worksite. Instead, air compressor functionality is conveniently built into the cart and the user's workload is thereby reduced.

17 Claims, 6 Drawing Sheets

(51) Int. Cl.
    *F04B 41/02*     (2006.01)
    *B62B 5/06*     (2006.01)

(56) References Cited

U.S. PATENT DOCUMENTS

| | | | | |
|---|---|---|---|---|
| D170,330 S * | 9/1953 | Miller | | D15/9 |
| 2,685,404 A * | 8/1954 | Wohlmeyer | | F04B 39/066 |
| | | | | 165/121 |
| 2,804,259 A * | 8/1957 | Ralston | | F04B 39/16 |
| | | | | 137/899.4 |
| 2,812,895 A * | 11/1957 | Peeps | | F04B 41/02 |
| | | | | 137/899.4 |
| 3,764,174 A * | 10/1973 | Taninecz | | B60R 19/20 |
| | | | | 293/107 |
| 4,087,101 A | 5/1978 | Shimazaki et al. | | |
| 4,621,984 A * | 11/1986 | Fussell | | F04B 35/06 |
| | | | | 417/234 |
| 4,662,551 A * | 5/1987 | Dudley | | A45F 3/08 |
| | | | | 224/262 |
| 5,116,207 A * | 5/1992 | Doolittle | | F04B 41/02 |
| | | | | 417/234 |
| 5,520,519 A * | 5/1996 | Birkeland | | F04B 39/12 |
| | | | | 417/307 |
| 5,681,370 A * | 10/1997 | McMahon | | B01D 53/261 |
| | | | | 95/105 |
| 6,293,313 B1 * | 9/2001 | McCrink | | F16L 9/02 |
| | | | | 138/125 |
| 6,468,048 B1 * | 10/2002 | Burkholder | | F04B 41/02 |
| | | | | 248/128 |
| 6,551,066 B2 * | 4/2003 | Saylor | | F04B 35/06 |
| | | | | 417/234 |
| 7,025,573 B1 * | 4/2006 | Hardin | | F04B 35/06 |
| | | | | 417/234 |
| 7,128,344 B2 * | 10/2006 | Sharp | | B62B 1/12 |
| | | | | 280/830 |
| 7,243,949 B2 * | 7/2007 | Valdez | | B60G 11/30 |
| | | | | 280/782 |
| 7,703,777 B2 * | 4/2010 | Horn, Jr. | | F04B 35/06 |
| | | | | 280/47.35 |
| 8,146,948 B2 | 4/2012 | Burns | | |
| 8,925,640 B2 | 1/2015 | McCoige | | |
| 9,758,103 B1 * | 9/2017 | Weant | | B62D 21/16 |
| 2003/0192963 A1 * | 10/2003 | Ebberts | | B01F 3/088 |
| | | | | 239/413 |
| 2003/0235505 A1 * | 12/2003 | Brunelli | | F04B 41/02 |
| | | | | 417/234 |
| 2006/0104835 A1 * | 5/2006 | Etter | | F04B 41/02 |
| | | | | 417/410.1 |
| 2007/0122292 A1 * | 5/2007 | Etter | | F04B 41/02 |
| | | | | 417/234 |
| 2008/0003111 A1 * | 1/2008 | Turan | | F04B 41/02 |
| | | | | 417/234 |
| 2008/0219860 A1 * | 9/2008 | Caito | | F04B 41/02 |
| | | | | 417/234 |
| 2020/0269937 A1 * | 8/2020 | Putz | | B62D 21/186 |

OTHER PUBLICATIONS

Razenhazen, Mobile Compressor Cart for Under $50, Instructables, retrieved on Nov. 1, 2018, pp. 1-8, https://www.instructables.com/id/mobile-compressor-cart-for-under-50.

* cited by examiner

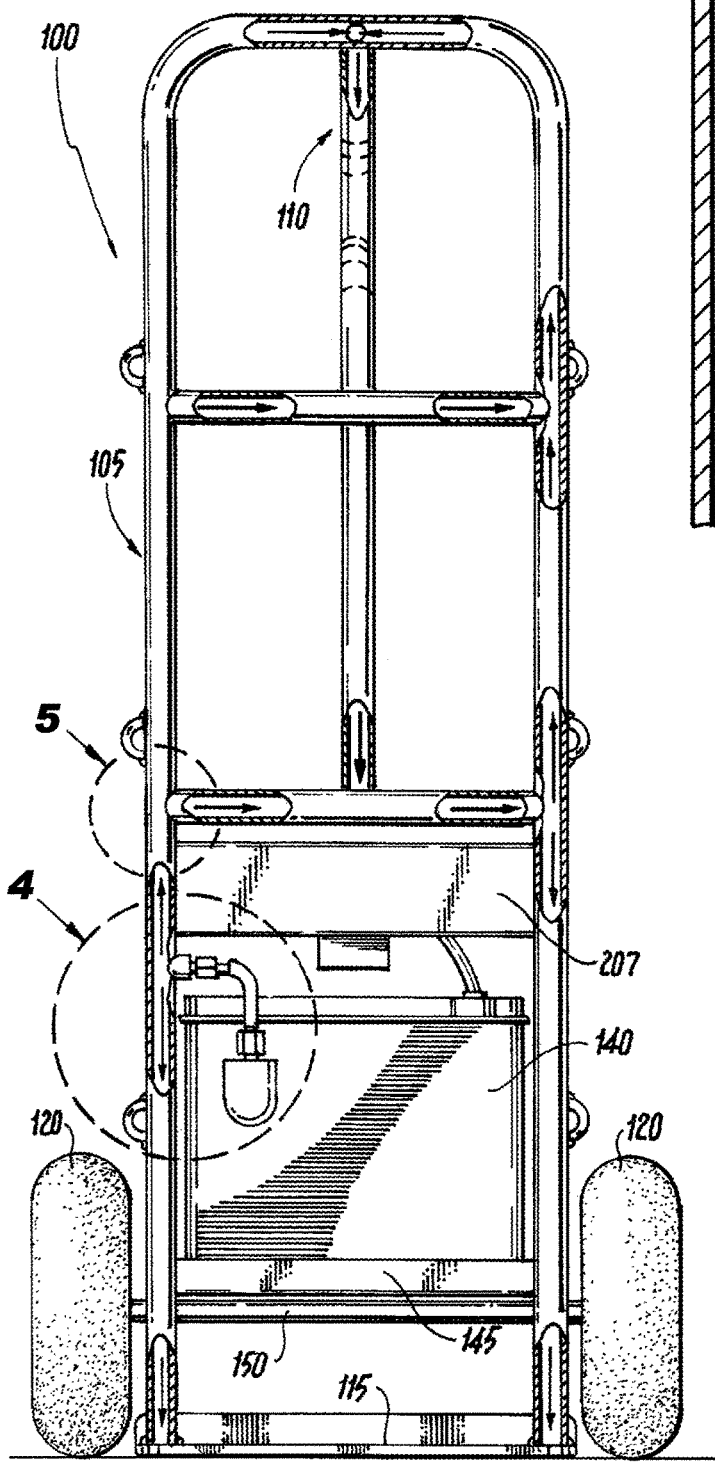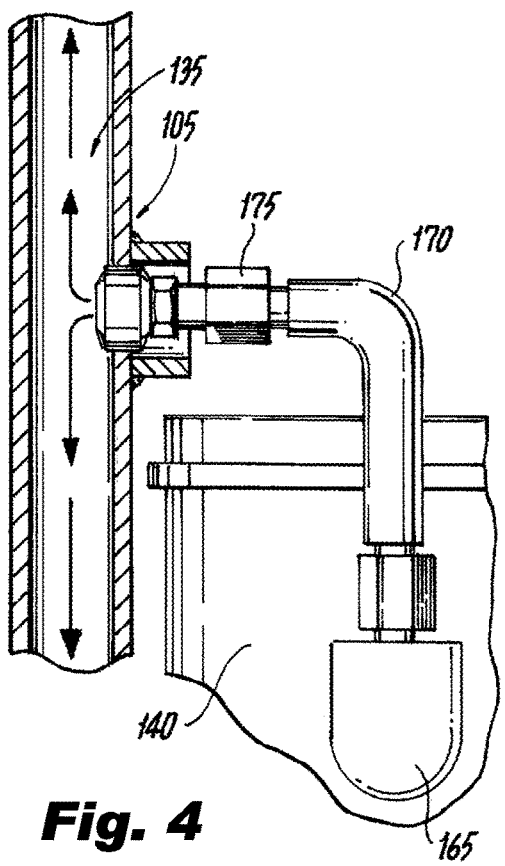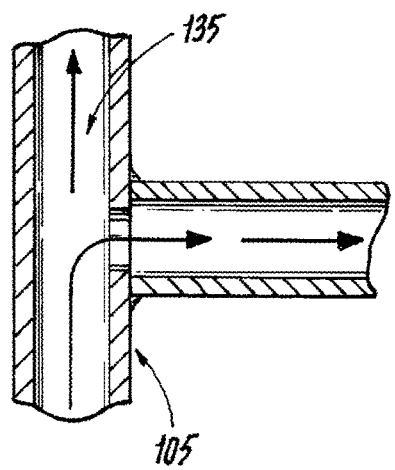
Fig. 3
Fig. 4
Fig. 5

CART WITH CAPACITY TO INTERNALLY STORE COMPRESSED AIR

BACKGROUND OF THE INVENTION

Compressed air is used in many industrial applications, including as a source of power for pneumatically-powered tools and as a source of high-velocity air in various cleaning tasks. Compressed air may be obtained from an air compressor. A typical portable air compressor comprises a compressor assembly, an air storage tank, and a pressure regulator assembly. In the compressor assembly, a motor drives a piston that reciprocates in a cylinder. An inlet valve and a discharge valve are located at the top of the piston's stroke. When the piston travels away from the valves, the inlet valve opens and allows uncompressed air to be sucked into the cylinder. During this motion the discharge valve remains closed. When the piston moves in the opposite direction (i.e., towards the valves), the inlet valve closes and the discharge valve opens, causing the air to be compressed as the piston rises and the available volume for the air is reduced. After passing through the discharge valve, the compressed air travels to the air storage tank through a discharge hose and through a check valve, which allows the air to only pass in one direction. A pressure limit switch monitors the pressure in the air storage tank and runs the compressor assembly when that pressure falls below a predetermined value. The compressed air in the air storage tank is provided to the pressure regulator assembly, which allows the user to select the pressure of the air provided by the portable air compressor.

Air compressors can be quite large and bulky, and thus may be burdensome to transport to and from a given worksite. As a result, there is a need for air compressor designs that are more easily transported than conventional designs.

SUMMARY OF THE INVENTION

Embodiments of the present invention address the above-identified needs by providing air compressor designs in the form of carts having structural elements that form internal storage volumes for compressed air.

Aspects of the invention are directed to a cart comprising a structural element, a compressor assembly and a pressure regulator. The structural element comprises a tubular frame member, a handle, or a deck, and defines an internal storage volume therein. The compressor assembly is in gaseous communication with the internal storage volume and is operative to deliver compressed air to the internal storage volume. Lastly, the pressure regulator assembly is also in gaseous communication with the internal storage volume and is operative to deliver compressed air from the internal storage volume at a regulated pressure.

Advantageously, embodiments in accordance with aspects of the invention provide cart designs that are capable of both transporting heavy loads and serving as sources of compressed air. A user utilizing one of these carts therefore does not need to transport a separate air compressor to a worksite. Instead, air compressor functionality is conveniently built into the cart and the user's workload is thereby reduced.

BRIEF DESCRIPTION OF THE DRAWINGS

These and other features, aspects, and advantages of the present invention will become better understood with regard to the following description, appended claims, and accompanying drawings where:

FIG. 3 shows a partially broken rear elevational view of the FIG. 1 cart;

FIG. 4 shows a magnified partially broken rear elevational view of a portion of the FIG. 1 cart in the region indicated in FIG. 3;

FIG. 5 shows a magnified sectional view of a portion of the FIG. 1 cart in the region indicated in FIG. 3;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, the term "cart" is intended to encompass any type of wheeled, non-motorized vehicle capable of conveying cargo while being pushed or pulled by one or more people, including, but not limited to, hand trucks, dollies, platform carts, wheel barrows, and the like.

Figure 1:
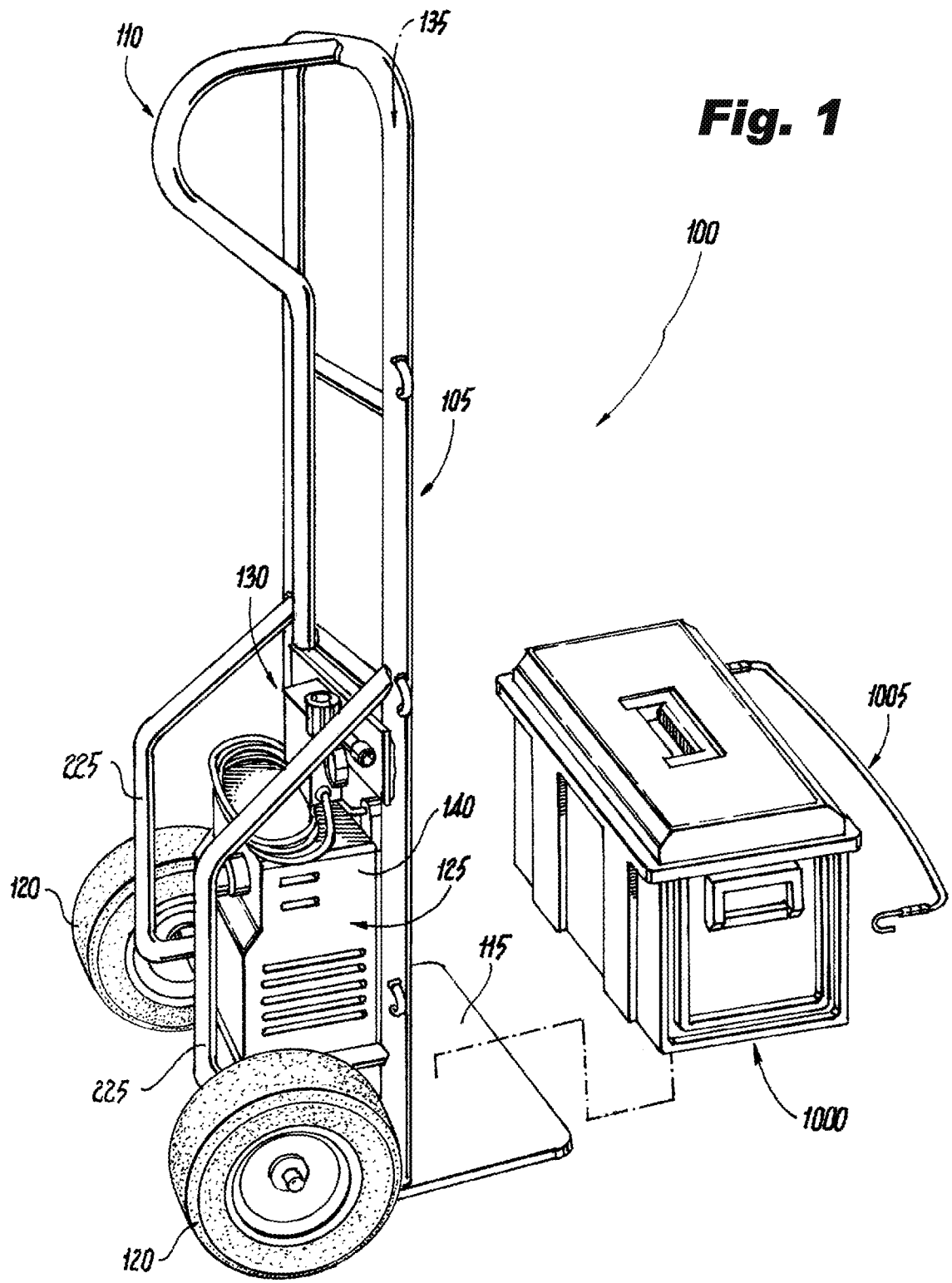
FIG. 1 shows a perspective view of a cart in accordance with an illustrative embodiment of the invention.

FIG. 1 shows a perspective view of a cart 100 in accordance with an illustrative embodiment of the invention. The cart 100 includes a tubular frame 105, a tubular handle 110, a small deck 115, and two wheels 120. The cart 100 is shown in association with a toolbox 1000, which may be attached to the cart 100 via a bungee cord 1005 so that the toolbox 1000 may be easily transported. In this manner, the cart 100 appears somewhat similar to a conventional hand truck. However, in a manner very different from conventional hand trucks, the cart 100 also comprises an integrated source of compressed air, allowing the cart 100 to substitute for a conventional portable air compressor.

The ability to act as a source of compressed air is provided by a compressor assembly 125, a means of storing compressed air, and a pressure regulator assembly 130. Uniquely, the tubular frame 105 and the tubular handle 110 combine to define an internal storage volume 135, which acts as the means of storing compressed air. That is, there is no air storage tank per se, but, instead, structural elements of the cart 100 (i.e., the tubular frame 105 and the tubular handle 110) combine to define the internal storage volume 135. The compressor assembly 125 is disposed in a protective housing 140 that is supported by the cart 100 and is operative to deliver compressed air to the internal storage volume 135. At the same time, the pressure regulator assembly 130 is in gaseous communication with the internal storage volume 135 and provides a means by which a user can access the compressed air stored therein.

Figure 2:
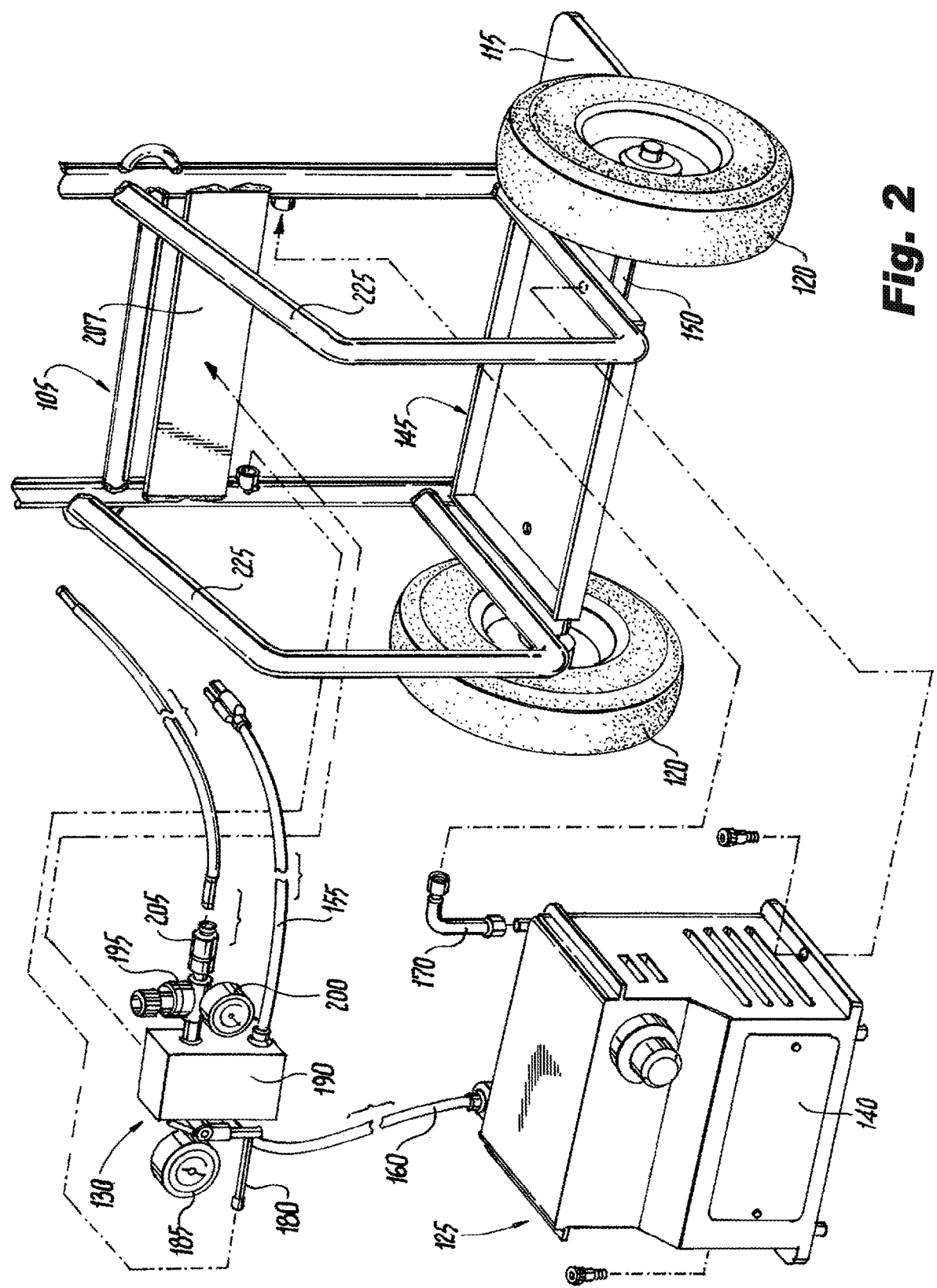
FIG. 2 shows an exploded perspective view of a portion of the FIG. 1 cart.

FIGS. 2 and 3 illustrate additional aspects of the cart 100, with FIG. 2 showing an exploded perspective view, and FIG. 3 showing a partially broken rear elevational view. As indicated earlier, the compressor assembly 125 is housed in the protective housing 140 and provides the means of generating compressed air from ambient (uncompressed) air. This protective housing 140, in turn, is bolted to a tray 145 that is supported by the cart 100 above an axle 150 for the two wheels 120.

In the present non-limiting illustrative embodiment, the compressor assembly 125 is electrically powered. A power line cord 155 emanates from the pressure regulator assembly 130. Electrical power from the pressure regulator assembly 130 to the compressor assembly 125 is via a power cable 160 that passes therebetween.

The compressor assembly 125 may comprise any number of compressive means, and these many means will already be familiar to one skilled in the relevant arts. The compressor assembly 125 may, for example, utilize a reciprocating piston driven by an electric motor in a manner similar to that described in the Background. It may be single-staged, using one side of a piston for compression, or double-staged, using two-sides of the piston for compression. Alternatively, the compressive means may comprise a rotary-screw compressor that utilizes helical screws to compress the air. In even one or more embodiments, the compressive means may comprise a centrifugal compressor that utilizes a spinning impeller to accelerate air and thereby compress it. These compressive means may be electrically powered, as is the case in the illustrative cart 100, or may instead be powered by gasoline or the like. If electrically powered, batteries may be utilized to store energy for those worksites where electrical power is not readily available. If desired, a temperature overload switch may be placed in electrical series with the compressive means for protection from over-temperature events.

Additional details of the connection between the compressor assembly 125 and the internal storage volume 135 are provided in the magnified partially broken rear elevational view in FIG. 4, which details the several elements within the circled region of the cart 100 indicated in FIG. 3. Compressed air generated by the compressor assembly 125 is directed out of a rear port 165 on the back of the protective housing 140, and then through a compressor assembly output tube 170 and a check valve 175 into the internal storage volume 135 within the tubular frame 105 and the tubular handle 110 of the cart 100. The check valve 175 only allows the compressed air to travel in one direction, in this case, from the compressor assembly output tube 170 into the internal storage volume 135. The check valve 175 inhibits the compressed air from traveling in the opposite direction.

The internal storage volume 135 within the tubular frame 105 and the tubular handle 110 forms one continuous volume. Accordingly, the compressed air, upon entering the internal storage volume 135, distributes to evenly occupy the entire internal storage volume 135 and exert a uniform pressure therein once at equilibrium. This distribution of the compressed air is diagrammatically represented by the arrows in FIG. 3. It is also shown diagrammatically in FIG. 5, which shows a magnified sectional view of the region of the tubular frame 105 circled in FIG. 3 at a spot where the tubular frame 105 forms a tee.

The pressure regulator assembly 130 receives compressed air from the just-described internal storage volume 135 and makes it available to the user at a user-adjustable pressure. Referring again to FIG. 2, the pressure regulator assembly 130 comprises input tubing 180, a storage pressure gauge 185, a control box 190, an adjustable pressure regulator 195, a regulated pressure gauge 200, and an output coupling 205. The pressure regulator assembly 130 is attached to the cart 100 above the compressor assembly 125 via a plate 207 that spans between two members of the tubular frame 105.

Figure 6:
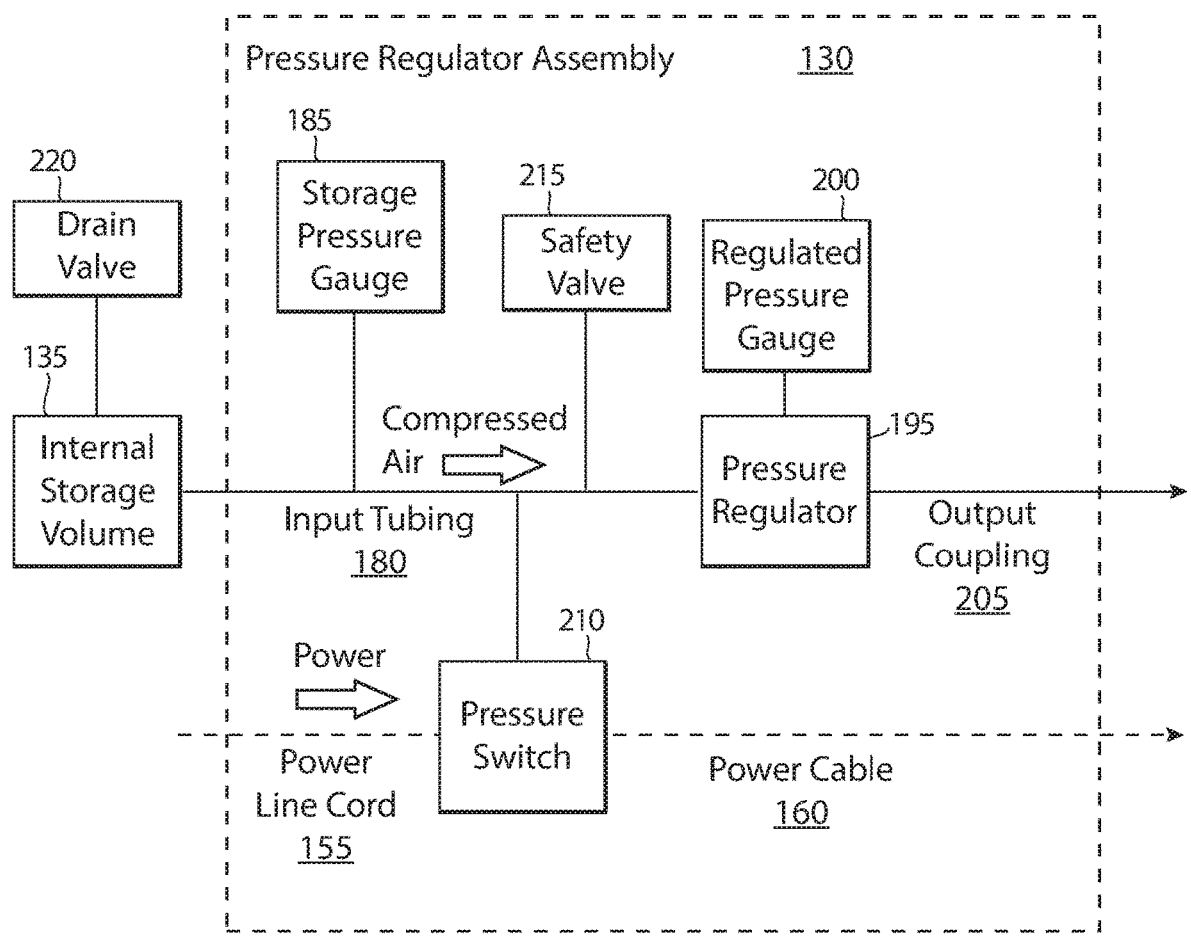
FIG. 6 shows a block diagram of a pressure regulator assembly in the FIG. 1 cart.

A block diagram of the pressure regulator assembly 130 is provided in FIG. 6. The input of the pressure regulator assembly 130 is connected to the internal storage volume 135 via the input tubing 180. The storage pressure gauge 185 measures the pressure here and thus measures a pressure in the internal storage volume 135. In one or more embodiments, this pressure may be, for example, about 150 pounds per square inch (psi), although this value is solely exemplary. The compressed air is then routed into the control box 190, which includes a pressure switch 210. The pressure switch 210 also measures the storage pressure, and activates a switch between the power line cord 155 and the power cable 160 going to the compressor assembly 125 in response thereto. When the pressure switch 210 measures a storage pressure lower than a predetermined value, the pressure switch 210 completes the connection between the power line cord 155 and the power cable 160, and the compressor assembly 125 is turned on. Conversely, when the storage pressure is higher than the predetermined value, the pressure switch 210 opens that connection and the compressor assembly 125 is turned off. After passing by the pressure switch 210, the compressed air is routed to the adjustable pressure regulator 195 which includes a knob that allows the user to select the regulated pressure. Here, the pressure is measured by the regulated pressure gauge 200. Finally, the compressed air is directed to the output coupling 205, where it is made available for use at the regulated pressure. In the present illustrative embodiment, the output coupling 205 comprises a quick coupling that allows a hose to be rapidly attached and detached from the cart 100. If desired, an in-line air filter may be placed before the output coupling 205 to aid in filtering the air received from the internal storage volume 135.

FIG. 6 also details two additional valves in gaseous communication with the internal storage volume 135. These include a safety valve 215 and a drain valve 220. In the present illustrative cart 100, the safety valve 215 is disposed in the pressure regulator assembly 130, but it may also be positioned somewhere on the tubular frame 105 or the tubular handle 110. It operates to automatically release pressure in the internal storage volume 135 if that pressure exceeds a predetermined value (set for that particular safety valve). It therefore acts as a safety device to avoid overpressurization. The drain valve 220 is preferably positioned at a low spot on the tubular frame 105. The drain valve 220 allows air and condensation in the internal storage volume 135 to be removed.

Referring again to FIGS. 1 and 2, it will be noted that frame extensions 225 are built into the cart 100. The frame extensions 225 protect the compressor assembly 125 and the pressure regulator assembly 130 while the cart 100 is in use. That is, these frame extensions 225 help to stop these assemblies 125, 130 from contacting the ground or other obstacles. These frame extensions 225 sit lateral to the compressor assembly 125 and the pressure regulator assembly 130.

Configured as indicated above, the cart 100 provides a source of compressed air while also providing a means of transporting equipment in the manner of a conventional hand truck. Because the compressed air is stored within the tubular frame 105 and the tubular handle 110 of the cart 100, a bulky storage tank is not required, keeping the cart 100 compact. When using the cart 100, there is no need to transport a separate portable air compressor to a worksite. Instead, the cart 100 provides this functionality.

Once at a worksite, use of the cart 100 is quite straightforward. The user simply plugs the power line cord 155 into a wall power outlet and sets the regulated pressure on the adjustable pressure regulator 195 using its knob. The user may then plug a pneumatic hose into the output coupling 205, and that user will have access to compressed air at the desired pressure.

Notably, if electrical power is not available at a given worksite and the need for compressed air is only moderate, the cart 100 may be charged with compressed air away from the worksite where power is readily available and then wheeled to the worksite. At this point, the compressed air stored in the internal storage volume 135 is available to the user without need for electrical power, although, of course, the compressed air will not be replenished until the cart 100 is again plugged in. In alternative embodiments, the cart 100 may also be powered by a battery, eliminating the need for wall power at a worksite while still giving the cart 100 the ability to run the compressor assembly 125 and replenish compressed air on demand.

Once understood from the description provided herein, the cart 100 may be fabricated using conventional fabrication methods and largely off-the-shelf components. For example, the tubular frame 105 and the tubular handle 110 of the cart 100 may be fabricated from steel or aluminum tubing using conventional welding techniques. Most, if not all, of the pneumatic components (including, for example, the compressive means; the gauges 185, 200; the pressure switch 210; the valves 175, 215, 220; the adjustable pressure regulator 195; and the various tubes, fittings, and couplings) may be readily obtained commercially. One source of suitable pneumatic components may be, for instance, W.W. Grainger, Inc. (GRAINGER®; Lake Forest, Ill., USA). Pneumatic systems are described in a number of readily available publications including, for example, S. R. Majumdar, Pneumatic Systems: Principles and Maintenance, Tata McGraw-Hill Publishing Co. Ltd., 1995 (reprint 2006), which is hereby incorporated by reference herein.

Advantageously, embodiments in accordance with aspects of the invention provide cart designs that are capable of both transporting heavy loads and serving as sources of compressed air. A user using one of these carts therefore does not need to bother with transporting a separate air compressor to a worksite. Instead, air compressor functionality is built into the cart and the user's workload is thereby reduced.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

In one or more alternative embodiments, for example, a cart may have a different design from the cart 100 set forth above. FIGS. 7-10 show perspective views of four such alternative carts 2000, 3000, 4000, 5000, respectively, each falling within the scope of the invention. These carts 2000, 3000, 4000, 5000 share many elements with the cart 100, including their compressor and pressure regulator assemblies. These like elements are not separately numbered in FIGS. 7-10 for economy of description. In each of the figures, arrows are used to diagrammatically represent the flow of compressed air within the respective internal storage volumes of the carts 2000, 3000, 4000, 5000.

Figure 7:
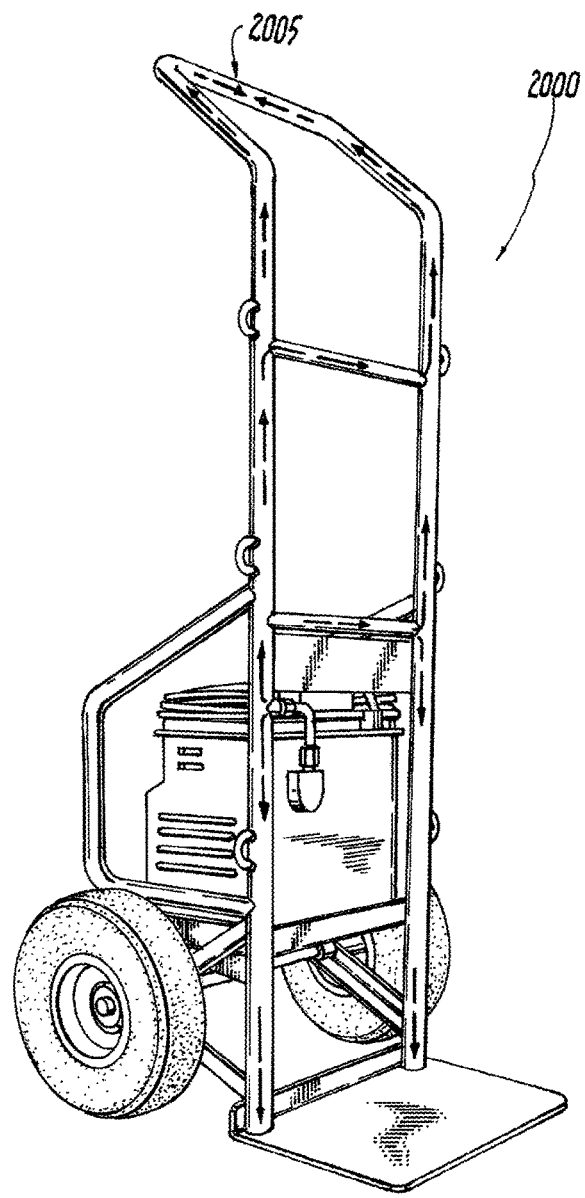
FIGS. 7-10 show perspective views of four alternative cart embodiments falling within the scope of the invention.
Figure 8:
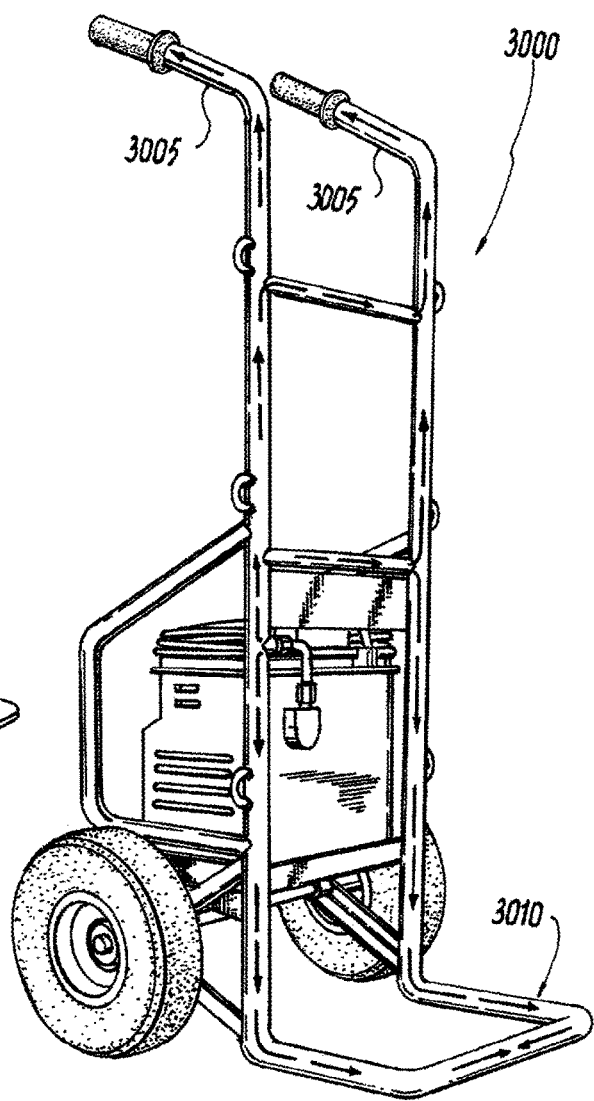
Figure 9:
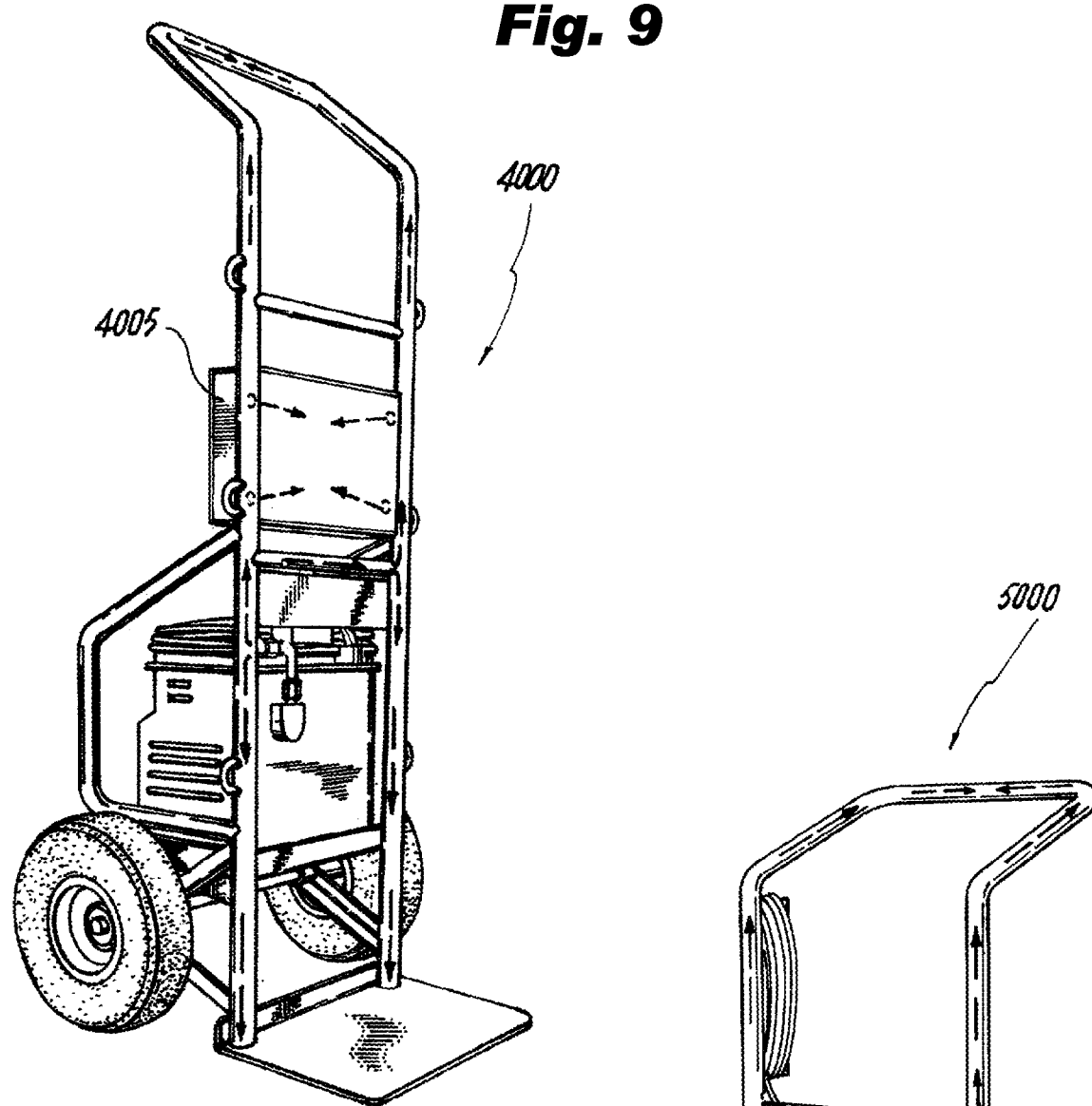

Carts 2000, 3000, 4000 in FIGS. 7-9 are forms of two-wheeled hand trucks like the cart 100. However, the cart 2000 in FIG. 7 includes a u-shaped tubular handle 2005 different from the rear-projecting, tubular handle 110 in the cart 100, while the cart 3000 in FIG. 8 utilizes two separate tubular handle portions 3005 and a tubular deck 3010 instead of the solid small deck 115. The cart 4000 in FIG. 9 is similar to the cart 2000 in FIG. 7, but includes an extra air storage tank 4005. This extra air storage tank 4005 is in gaseous communication with the frame-and-handle-based internal storage volume of the cart 4000, adding extra compressed air storage capacity to the cart 4000.

Figure 10:
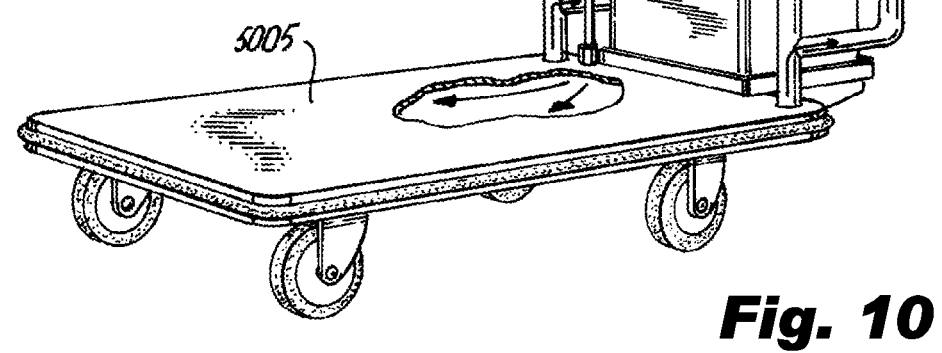

The alternative cart 5000 in FIG. 10 is perhaps the most different from the cart 100. The cart 5000, rather than being a form of hand truck, is instead configured as a four-wheel platform cart (or platform truck) with a large deck 5005. Here, the internal storage volume for the cart 5000 is in the large deck 5005 as well as in the tubular frame of the cart 5000. Given the large internal storage volume provided by the large deck 5005, compressed air storage capacity can be quite large for this design. It is likewise contemplated that compressed air capabilities of the kind illustrated above can be built into any number of different cart designs (e.g., pallet trucks, beach wagons, bar carts, hand trollies, etc.).

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A cart comprising:
   a tubular frame defining an internal storage volume therein;
   a pair of wheels operative to rotate about a common rotational axis;
   a deck attached to the tubular frame, the deck comprising an exposed, flat upper surface and a flat lower surface;
   a compressor assembly in gaseous communication with the internal storage volume and operative to deliver compressed air to the internal storage volume; and
   a pressure regulator assembly also in gaseous communication with the internal storage volume and operative to deliver compressed air from the internal storage volume at a regulated pressure;
   wherein the cart is positionable in an upright position on a flat horizontal surface such that, simultaneously:
      the pair of wheels are disposed on the flat horizontal surface in a rolling configuration;
      the flat lower surface lays flat against the flat horizontal surface; and
      none of the compressor assembly is directly above the deck.

2. The cart of claim 1, wherein:
   the cart further comprises a handle defining a second internal storage volume therein; and
   the second internal storage volume is in gaseous communication with the internal storage volume.

3. The cart of claim 1, wherein the compressor assembly is housed in a protective housing.

4. The cart of claim 1, wherein the compressor assembly is electrically powered.

5. The cart of claim 1, wherein the cart comprises a battery operative to power the compressor assembly.

6. The cart of claim 1, wherein the compressor assembly comprises a reciprocating piston, helical screw, or spinning impeller.

7. The cart of claim 1, further comprising a check valve between the compressor assembly and the internal storage volume that allows compressed air to only travel in a direction from the compressor assembly to the internal storage volume.

8. The cart of claim 1, wherein the regulated pressure is user-adjustable.

9. The cart of claim 1, wherein the pressure regulator assembly comprises:
   a storage pressure gauge indicating a storage pressure of the compressed air in the internal storage volume; and
   a regulated pressure gauge operative to indicate the regulated pressure.

10. The cart of claim 1, wherein the pressure regulator assembly comprises a user-accessible output that allows a user to access the compressed air in the internal storage volume.

11. The cart of claim 1, wherein the pressure regulator assembly comprises a pressure switch operative to switch power to the compressor assembly in response to storage pressure in the internal storage volume.

12. The cart of claim 1, wherein the pressure regulator assembly comprises a safety valve operative to automatically release storage pressure in the internal storage volume if the storage pressure exceeds a predetermined value.

13. The cart of claim 1, wherein the cart comprises a drain valve operative to allow air and condensation to be removed from the internal storage volume.

14. The cart of claim 1, further comprising an axle spanning between the pair of wheels.

15. The cart of claim 1, wherein a portion of the compressor assembly is directly above the common rotational axis when the cart is in the upright position.

16. The cart of claim 1, further comprising a tray supporting the compressor assembly, a portion of the tray disposed directly above the common rotational axis when the cart is in the upright position.

17. A cart comprising:
   a tubular frame defining an internal storage volume therein;
   a deck attached to the tubular frame, the deck comprising a plate having an exposed, flat upper surface and defining a second internal storage volume therein with the plate forming a wall of the second internal storage volume;
   a compressor assembly in gaseous communication with the internal storage volume and operative to deliver compressed air to the internal storage volume; and
   a pressure regulator assembly also in gaseous communication with the internal storage volume and operative to deliver compressed air from the internal storage volume at a regulated pressure;
   wherein the second internal storage volume is in gaseous communication with the internal storage volume.

* * * * *